United States Patent [19]
Baird et al.

[11] Patent Number: 5,118,271
[45] Date of Patent: Jun. 2, 1992

[54] APPARATUS FOR ENCAPSULATING A SEMICONDUCTOR DEVICE

[75] Inventors: John Baird, Scottsdale; James H. Knapp, Gilbert, both of Ariz.

[73] Assignee: Motorola, Inc., Schaumburg, Ill.

[21] Appl. No.: 658,817

[22] Filed: Feb. 22, 1991

[51] Int. Cl.[5] ............... B29C 39/10; B29C 41/02
[52] U.S. Cl. ......................... 425/116; 425/127
[58] Field of Search ............ 425/116, 117, 123, 127; 264/275, 277, 278, 272.15, 272.16, 272.17

[56] References Cited

U.S. PATENT DOCUMENTS

| | | | |
|---|---|---|---|
| 3,009,578 | 11/1961 | Foote et al. | 264/278 |
| 4,236,689 | 12/1980 | Hass | 425/116 |
| 4,626,185 | 12/1986 | Monnet | 425/116 |
| 4,686,073 | 8/1987 | Koller | 264/272.15 |
| 4,686,765 | 8/1987 | Byers et al. | 264/272.16 |
| 4,688,752 | 8/1987 | Barteck et al. | 425/116 |

Primary Examiner—Willard Hoag
Attorney, Agent, or Firm—Stuart T. Langley

[57] ABSTRACT

An elastic material covering an outer surface of a cavity plate but not covering any clamping surfaces of the cavity plate or the inner surface of the cavity plate is used to eliminate use of a dam bar in a lead frame. In an embodiment in accordance with the present invention the elastic material provides a supplementary seal to the clamping surfaces of the cavity plate and a primary seal in spaces between leads of the encapsulated lead frame. In a method of using the present invention, the elastic material is placed between the mold base and the cavity plate. A semiconductor lead frame to be encapsulated is placed in cavities provided by the cavity plate. The mold is closed so that clamping surfaces of the cavity plate clamp directly onto the leads. The elastic material deforms under pressure to compensate for any dimensional variations of the mold plates or lead frame and completely seals the space between leads.

6 Claims, 5 Drawing Sheets

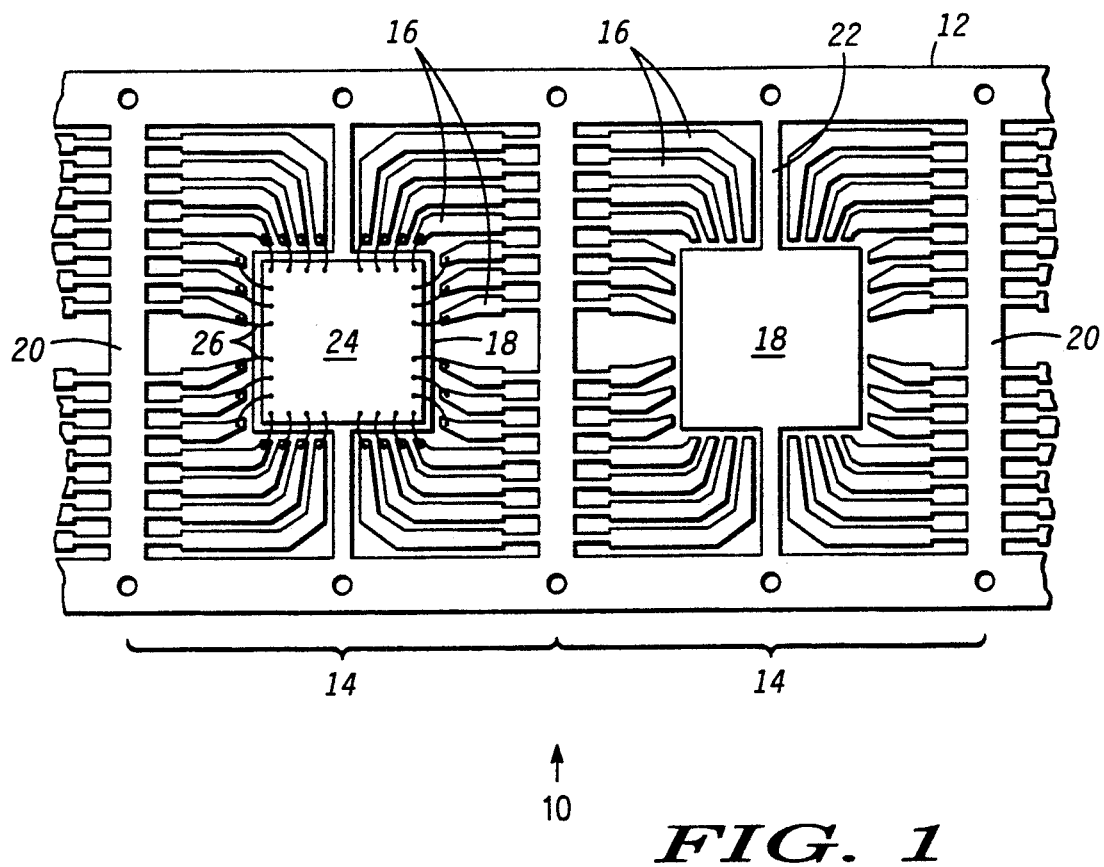
FIG. 1
FIG. 2
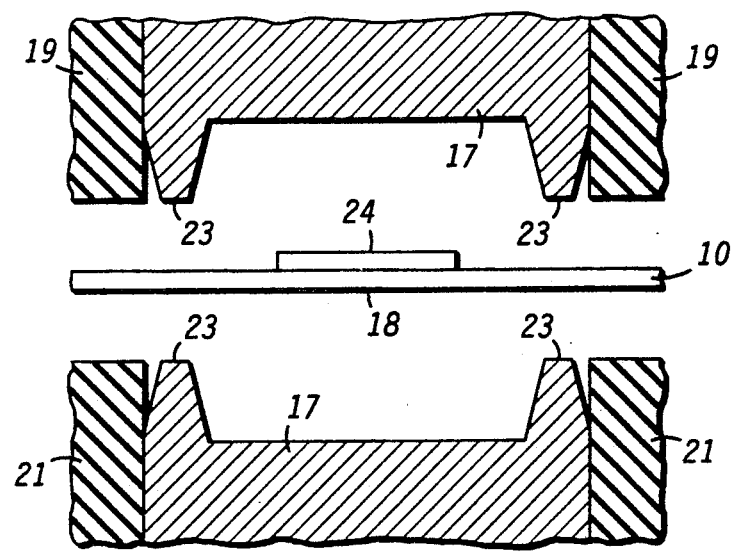

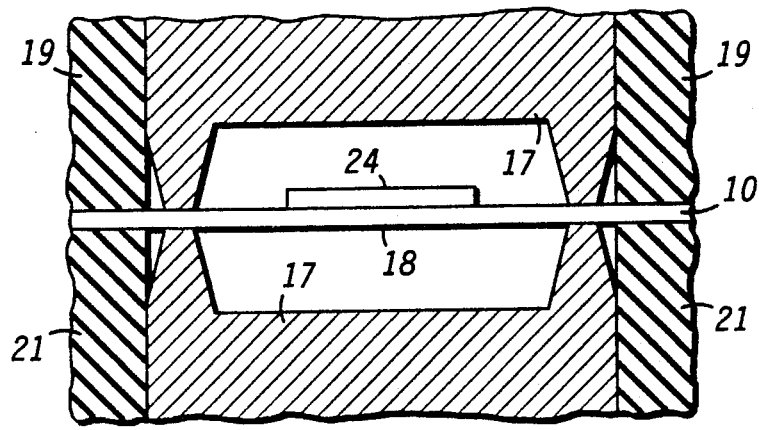
FIG. 3A
FIG. 3B
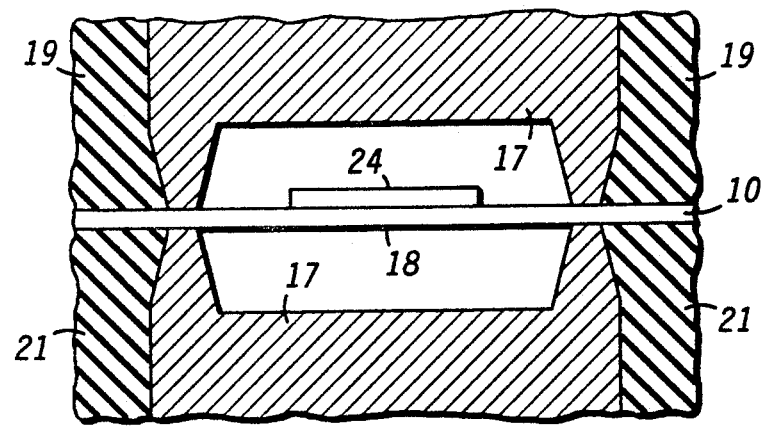

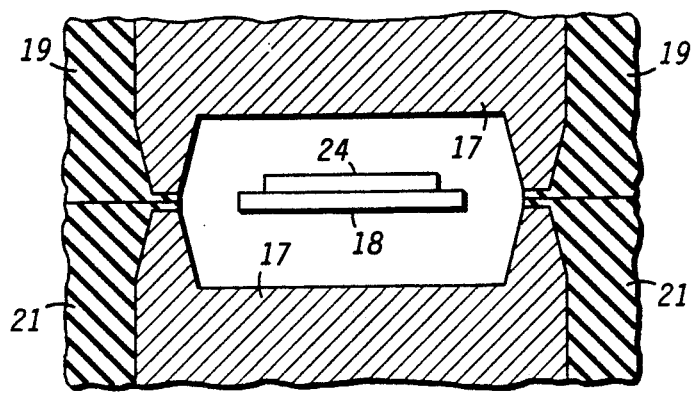
FIG. 4
FIG. 5
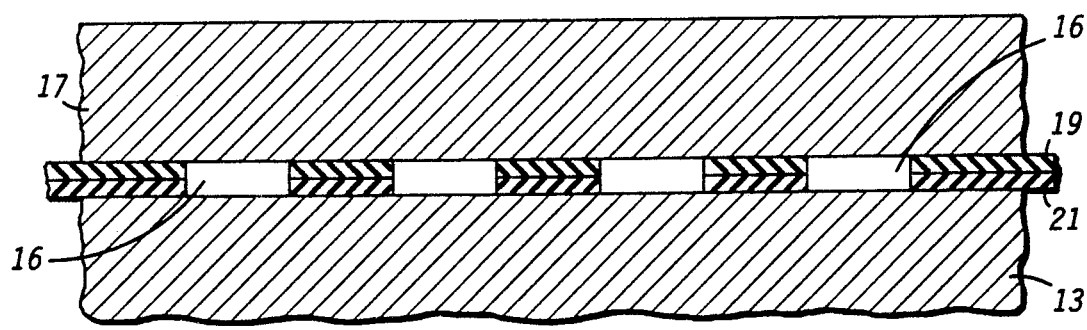

APPARATUS FOR ENCAPSULATING A SEMICONDUCTOR DEVICE

BACKGROUND OF THE INVENTION

This invention relates generally to a method and apparatus for fabricating a semiconductor device, and more specifically to a method and apparatus for plastic encapsulation of high lead count semiconductor devices.

Semiconductor devices are produced in die form and the die is then attached to a lead frame and a protective plastic body is molded about the die. In the case of fabricating a semiconductor device of the type known as a dual inline package (DIP), plastic quad flat pack (PQFP), or the like, the semiconductor die is attached to a die bond area of a metal lead frame and the lead fingers of the lead frame are attached to bonding pads on the die by fine wires, tape, or the like.

A lead frame having many semiconductor dice attached is placed in a mold assembly and a plastic encapsulant material is forced into the mold assembly under high pressure and at an elevated temperature to form plastic bodies about the die, die bond area, inner ends of the lead fingers, and the interconnecting wires or tapes. Because the encapsulating material enters the mold under high pressure, the mold must be carefully sealed to avoid the unwanted escape of material in the formation of "flash", which is a thin extrusion of the encapsulating material attached to the lead frame outside the package body which must be removed.

Usually, an upper mold half and a lower mold half forming a plurality of cavities therebetween is used. A semiconductor devices is located on the lower mold hair mold plate, the upper mold half mold plate is closed on the lead frame and encapsulating material is injected into the cavity to encapsulate the semiconductor device. The mold plates are machined to very tight tolerance. However, it is more difficult to maintain the semiconductor device to the same tight tolerances. The mold plates comprise a rigid material such as tool steel. The semiconductor lead frame is clamped between the mold plates with the intention that the package dimensions be entirely determined by the dimensions of the mold cavity plate. The rigidity of the cavity plate required use of the dam bar to prevent encapsulant from escaping the cavity in the space between the leads. Even when a dam bar was used, however, it is extremely difficult to maintain machining tolerances at a level that will avoid mold flash from escaping through small spaces in the machine surfaces.

The lead frames of complex integrated circuits include many closely spaced metal fingers. To seal the mold and prevent the escape of plastic encapsulating material between the lead fingers, common practice has been to provide a dam bar extending between the leads as disclosed in U.S. Pat. No. 3,444,441. After encapsulation, the dam bar is removed between adjacent lead fingers before device testing. As the number of leads increases and as the spacing between the leads decreases, it becomes more and more difficult to remove the dam bar without damaging or bending the lead fingers. Dam bar removal is expensive. Each different package body and different lead pitch for the same package body requires different dam bar removal tooling. The dam bar removal tool is easily damaged resulting in delays and increased manufacturing cost.

In an alternate process, which is even more expensive, edges of the mold are castellated to provide mold projections which extend between the led fingers. Again, as the number of lead fingers increases and the spacing between them decreases, it becomes extremely difficult and expensive to form and maintain the castellations.

Accordingly, it is an object of the present invention to provide a mold assembly which uses a resilient material to compensate for dimensional variations of both a cavity plate and a semiconductor lead frame being encapsulated.

Another object of the present invention is to use a resilient material to seal a space between leads and replace a conventional dam bar.

Another object of the present invention is to provide a mold apparatus using resilient seals which maintains cavity dimensions determined by dimensions of a rigid cavity plate.

A further object of the present invention is to provide a method for encapsulating a semiconductor devices wherein a sheet of elastic material is used as both a supplementary seal to a clamped cavity plate and a primary seal between leads where no cavity plate extends.

SUMMARY OF THE INVENTION

The above and other objects and advantages of the present invention are achieved by the use of an elastic material which covers an outer surface of a cavity plate but does not cover any clamping surfaces of the cavity plate or an inner surface of the cavity plate. In an embodiment in accordance with the present invention the elastic material provides a supplementary seal to the clamping surfaces of the cavity plate and a primary seal in space between leads of the encapsulated lead frame.

In a method of using the present invention, the elastic material is placed between the mold base and the cavity plate. A semiconductor lead frame to be encapsulated is placed on a mold surface in relation to cavities provided on that surface by the cavity plate. The mold is closed so that clamping surfaces of the cavity plate clamp directly onto the leads. After the mold plates are closed, the elastic material is pressurized and deforms to compensate for any dimensional variations of the mold plates or lead frame and completely seals the space between leads.

BRIEF DESCRIPTION OF THE DRAWINGS

FIG. 1 illustrates a metallic lead frame having a semiconductor device attached for use in a device fabrication process in according with the present invention;

FIGS. 2, 3A, 3B and 4 illustrate a highly simplified cross-sectional view of a mold apparatus in accordance with the present invention;

FIG. 5 illustrates a cross-section taken orthogonally to the cross-section shown in FIG. 2-FIG. 4;

DETAILED DESCRIPTION OF THE DRAWINGS

Figure 6:
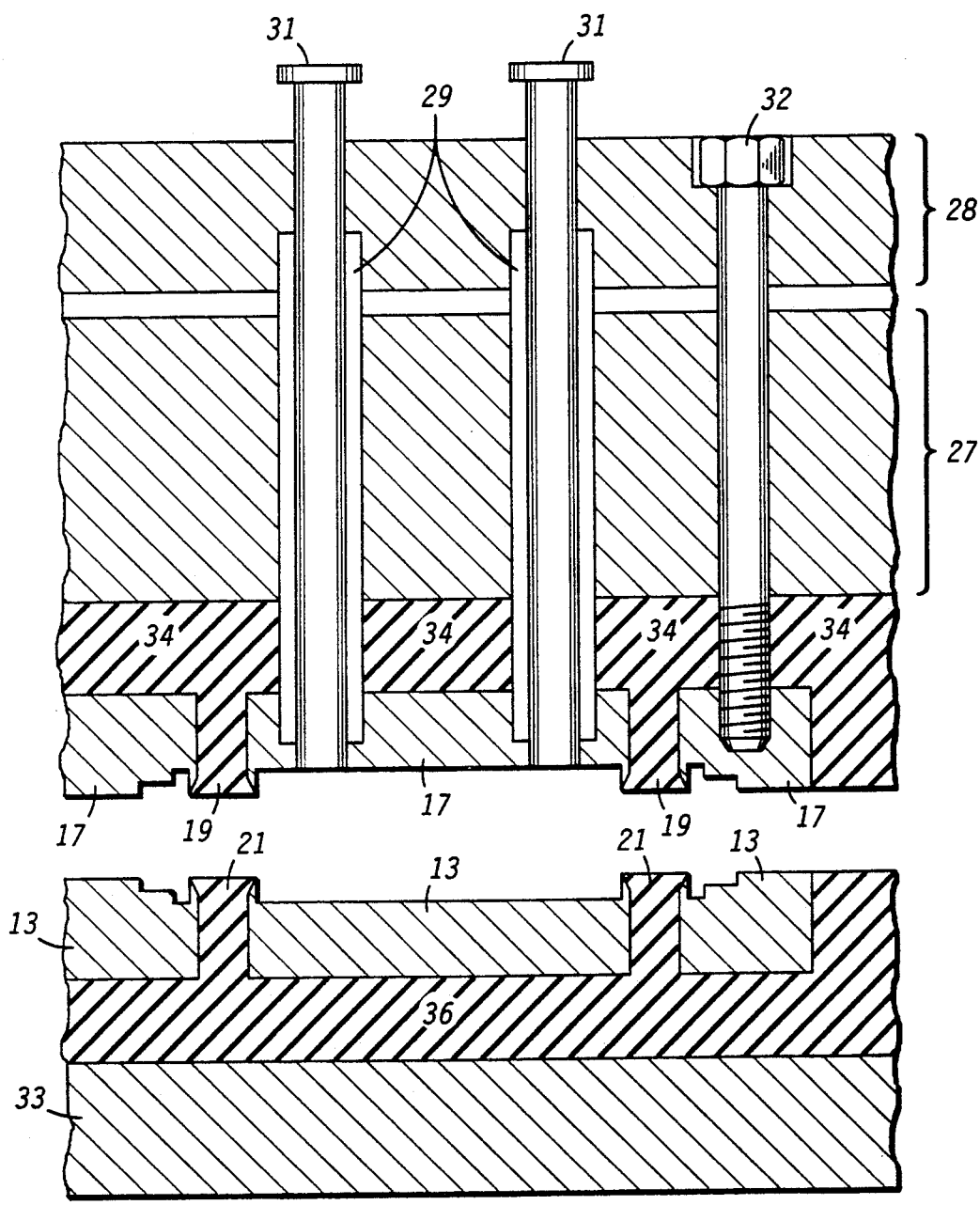
FIG. 6 illustrates a cross-sectional view of a first embodiment molding apparatus adapted to use the method of the present invention.

FIG. 1 illustrates a metallic lead frame 10 for use in fabrication of semiconductor devices in accordance with the present invention. Lead frame 10 includes side rails 12 which support a plurality of groups 14 of leads 16 and die attach areas 18. The leads have an inner end near die attach portion 18 and an outer end coupled to a cross member 20. Die attach area 18 is joined to siderail 12 by tie bar 22. Lead frame 10 is similar to conventional lead frames and may take any of the various shapes and configurations which conventional lead frames take including more or fewer leads, different sizes, different shapes, and the like. The notable difference between lead frame 10 used in accordance with this invention and those conventionally used is the lack of a dam bar which is normally present. A dam bar would interconnect leads 16, be parallel to cross member 20, and would be positioned between cross member 20 and die mount portion 18.

Also illustrated in FIG. 1 is the attachment of a semiconductor device die 24 to one of die attach areas 18. Die 24 is bonded to die attach area 18 by solder, conductive epoxy, or the like. Semiconductor die 24 is electrically connected to each of leads 16 by fine wire 26, TAB tape, or the like. Although not illustrated in this figure, one die is attached to each die attach area 18 for each group of leads 14. Upon completion of fabrication of the semiconductor devices, each of groups 14 of leads 16 will be used for a completed semiconductor device.

FIG. 2 illustrates a highly simplified cross-sectional view of an open molding apparatus prior to encapsulation of the lead frame. First cavity plate 17 and second cavity plate 13 are shaped to define a cavity about semiconductor die 24 when closed together. Semiconductor die 24 mounted on die mount portion 18 of lead frame 10 is placed inside the cavity. A portion of cavity plate 17 and 13 near an edge of the cavity tapers to form clamping surfaces 23. Cavity plates 17 and 13 are formed of a rigid material such as tool steel which is precision machined so that clamping surfaces 23 form a primary seal against lead 16 (not shown) of lead frame 10 when pressed against it.

First elastic seals 19 are placed adjacent to the cavity. It is important that elastic seals 19 do not cover clamping surface 23 or the interior surface of cavity plate 17. Cavity plate 17 is completely surrounded by elastic material 19 in a first embodiment, shown in more detail in FIG. 6. Elastic material 19 is formed as a mold insert which is separately pressurized in a second embodiment, described in more detail in regard to FIG. 7. As will become more apparent, is important that elastic material 19 be near clamping surface 23.

FIG. 3A illustrates a cross-section of FIG. 2 once the mold is closed. Leads 16 (not shown) of lead frame 10 are clamped firmly between clamping surfaces 23 of first mold plate 17 and second mold plate 13. The clamping surface thus provide the primary seal against escape of encapsulant, which is injected into the cavity. First elastic seals 19 contact the upper surface of lead frame 10 and second elastic seals 21 contact the lower surface of lead frame 10.

FIG. 3B illustrates a cross section shown in FIG. 3A after elastic seals 19 and 21 are pressurized. Elastic seals 19 and 21 are pressurized after the mold is closed. Elastic seals 19 and 21, at high pressure, conform to the shape of the outer surface of cavity plates 17 and 13, respectively. Elastic seals 19 and 21 fill in the tapered region leading towards clamping surfaces 23 and rest snugly up against clamping surfaces 23 thereby providing a supplementary seal against escape of encapsulant over the top and bottom of leads 16.

FIG. 4 illustrates another cross-section of the closed molding apparatus after seals 19 and 21 are pressurized through a section in which there are no leads 16. The absence of leads 16 leaves a space between clamping surfaces 23. Elastic seals 19 and 21, at high pressure, deform and press together and seal the space left between leads.

As shown in FIG. 5, elastic seals 19 and 21 conform to fill spaces between leads while cavity plates 17 and 13 clamp against leads 16 directly to seal against encapsulant escape over the tops of leads 16. It is important to note that elastic seals 19 and 21 do not act as gaskets as the seals do not extend over clamping surfaces of cavity plates 17 and 13. If elastic material 10 and 21 were configured as gaskets, as they deform they would enter uncontrollably into the cavity leaving marks and deformation on the surface of the encapsulated package. Further, gaskets would wear quickly and provide noticeably poor sealing around the critical surfaces on the top and bottom of leads 16.

A suitable material for making elastic seals 19 and 21 are silicone rubber or silicone elastomer materials. Depending on the actual operating temperatures of the mold apparatus and chemical composition of the encapsulant, other elastic materials may be available which will perform a similar function.

FIG. 6 illustrates a practical mold apparatus adapted to use the method of the present invention. Cavity plates 17 and 13 are configured to produce a PQFP having a main body cavity and a surrounding ring cavity. In this embodiment, upper cavity plate 17 is completely surrounded by elastic seal 19. Elastic seal 19 extends so that it is adjacent to all package edges and edges of the molded carrier ring. Cavity plate 13 rests on elastic bed 36. Elastic bed 36 is attached to mold base 33. Similarly, cavity plate 17 rests on elastic bed 34 which is attached to an upper mold base 27. As a practical matter, elastic bed 34 and elastic seals 19 may be formed of a continuous piece of elastic material. Similarly, elastic bed 36 and elastic seals 21 may be formed of a continuous piece of material.

Ejector pins 31 are commonly used to force the encapsulated device out of the mold apparatus once encapsulation is complete. Use of elastic beds 34 and 36 as well as elastic seals 19 and 21 complicate the ejector pin process somewhat. Because elastic materials can not be formed to the exacting tolerance of other machine parts, thickness of elastic beds 34 and 36 may vary considerably. Further, thermal expansion of elastic materials and other materials properties vary considerably more in elastic materials than more commonly used rigid steel. Since it is important that ejector pins 31 are placed accurately with respect to the cavity formed by cavity plates 17 and 13, ejector pins 31 must be aligned to the inner surface of cavity plate 17.

This is accomplished by attaching cavity plate 17 to a reference plate 28 by screw 32. A plurality of such attachments may be made as necessary to assure vertical orientation of reference plate 28 with respect to cavity plate 17. Sleeves 29 extend from reference plate 28 through mold base 27 and elastic bed 34 into cavity plate 17. Ejector pins 31 pass through sleeve 29 into the cavity formed by cavity plates 17 and 13. Since the vertical spacing of reference plate 28 is carefully controlled with respect to cavity plate 17 by sleeve 29, extension of ejector pins 31 into the cavity is also be tightly controlled even with large variations in thickness of elastic bed 34. Use of reference plate 28 and retaining screw 32 in the manner shown in FIG. 6 facilitates the use of elastic materials for elastic beds 34 and 36 and elastic seals 19 and 21.

Figure 7:
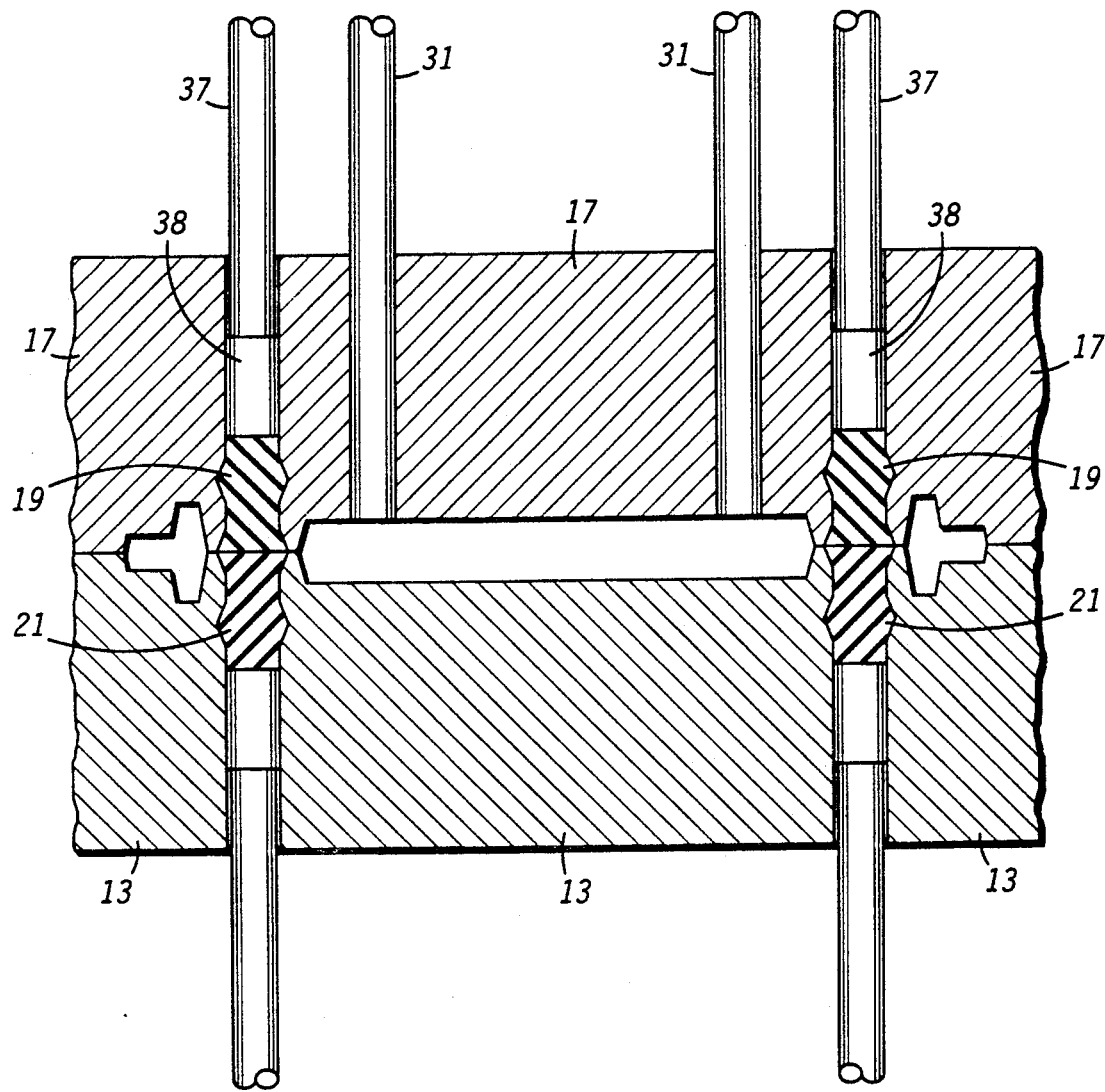
FIG. 7 illustrates a cross-sectional view of a second embodiment of a molding apparatus adapted to use the method of the present invention.

In a second embodiment shown in FIG. 7, elastic seals 19 and 21 are pressurized separately after cavity plates 17 and 13 are closed. An independently controlled hydraulic cylinder (not shown) is used to pressurize seals 19 and 21 via members 37 and 38. Although depicted as a rod 37 and piston 38, other methods of independently pressurizing seals 19 and 21 will be apparent to those of skill in the art. Elements shown in FIG. 7 which correspond to elements of FIG. 6 are identified with the same number as used in FIG. 6.

By now it should be appreciated that a mold apparatus has been provided which eliminates the need for a dam bar in a lead frame to be encapsulated. Elimination of the dam bar greatly simplifies the assembly process and reduces cost and damage to the parts. An elastic seal serves both as a supplementary seal to a conventional cavity plate which clamps to the lead frame and as a primary seal in spaces between the leads where a dam bar has been used in the past. The elastic seal prevents encapsulant from escaping the cavity, greatly reducing flash between and on top of the leads extending from an encapsulated device.

We claim:

1. A mold assembly for encapsulating at least a portion of a semiconductor lead frame, wherein the lead frame has a plurality of leads extending therefrom and a plurality of open spaces between the leads, the mold assembly comprising: a first mold base and a second mold base; a first cavity plate attached to the first mold base; a second cavity plate attached to the second mold base, each cavity plate further comprising an inner and an outer surface, wherein an outer edge of the cavity plate tapers to form a clamping surface, wherein the semiconductor lead frame fits in a cavity formed by the inner surfaces of the first and the second cavity plates and the leads are clamped between the clamping surfaces so that dimensions of the cavity around the leads are defined by the inner surface of the cavity plate; a first elastic seal attached to the first mold base; and a second elastic seal attached to the second mold base, wherein the first and second elastic seals can be pressurized to conform to the outer surface of the cavity plates and provide a supplementary seal to the clamping surfaces around the plurality of leads and provide a primary seal in the plurality of open spaces between the leads.

2. The mold assembly of claim 1 wherein the elastic seal is confined by the mold base and the outer surface of the cavity plate except in the space between the leads.

3. The mold assembly of claim 1 wherein the elastic seal extends into the cavity only in the plurality of open spaces between the leads.

4. The mold assembly of claim 3 wherein the elastic seals comprise silicone rubber.

5. The mold assembly of claim 1 further comprising an elastic bed surrounding the outer surface of the first and second cavity plates and separating the first and second cavity plates from the first mold base and the second mold base, respectively.

6. The mold assembly of claim 5 further comprising: a reference plate; a retention screw coupling the first cavity plate to the reference plate; at least one hollow sleeve passing from the reference plate through the elastic bed to the first cavity plate; and an ejector pin passing through the hollow sleeve.

* * * * *